Figure 1:
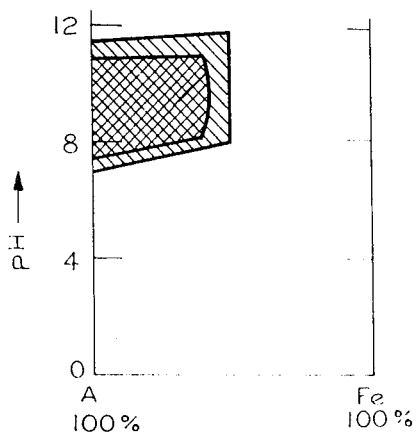

United States Patent

[11] 3,622,268

[72] Inventors Takeo Wada;
 Kazuo Okada, both of Suita, Japan
[21] Appl. No. 808,493
[22] Filed Mar. 19, 1969
[45] Patented Nov. 23, 1971
[73] Assignee Takeda Chemical Industries Ltd.
 Osaka, Japan
[32] Priorities Mar. 20, 1968
[33] Japan
[31] 43/18136;
 Apr. 10, 1968, Japan, No. 43/23846; July 25, 1968, Japan, No. 43/52704

[54] METHOD FOR RECOVERY OF METALLIC CATIONS
7 Claims, 4 Drawing Figs.

[52] U.S. Cl. .................................................. 23/22,
 23/23, 23/88, 23/89, 23/102, 23/117, 23/121, 23/53, 260/541
[51] Int. Cl. .................................................. C01b 59/00

[50] Field of Search .................................................. 23/50, 102, 113, 50 BE, 22, 23, 117, 88

[56] References Cited
UNITED STATES PATENTS

| | | | | |
|---|---|---|---|---|
| 3,382,034 | 5/1968 | Kraus | | 23/50 |
| 3,497,314 | 2/1970 | Thomas | | 23/50 |

FOREIGN PATENTS

| | | | |
|---|---|---|---|
| 984,502 | 2/1965 | Great Britain | 23/113 |

*Primary Examiner*—Herbert T. Carter
*Attorney*—Wenderoth, Lind and Ponack

ABSTRACT: A method for recovery of metallic cations whereby a zeolitic material represented by the formula $$M_xH_{5-x}[(Al_yFe_{1-y})_4(P_lAs_{1-l})_3O_{16}] \cdot zH_2O$$

wherein M represents a univalent or a 1/2 bivalent cation and $x, y, z$ and $l$ are numerical values of $o \leqq x \leqq 5, o \leqq y \leqq 1, z \leqq 9$ and $o \leqq l \leqq 1$, respectively; is contacted with a solution containing metallic cations, whereby the cations represented by M are exchanged by the desired metallic cation, and the zeolitic material is washed with an acid to recover the metallic cations.

METHOD FOR RECOVERY OF METALLIC CATIONS

This invention relates to a method for recovery of metallic cations utilizing particular zeolitic materials composed of alumino/ferro-phosphate/arsenate.

The recovery of metallic cations by the use of cation exchange membranes has heretofore been known, of which mechanisms are illustrated as the following:

$$A^+[R]^- + B^+(aq) + C^+(aq) \rightleftharpoons B^+[R]^- + A^+(aq) + C^+(aq)$$
$$B^+[R]^- + H^+(aq) \rightleftharpoons H^+[R]^- + B^+(aq)$$

wherein $A^+$ stands for a cation contained in the membrane, $B^+$ stands for a metallic cation to be recovered in an aqueous solution, $C^+$ stands for a cation co-existing in the aqueous solution, $[R]^-$ stands for an anion framework of the membrane. The cation exchange reactions depend on such factors as a cation selectivity in the membranes, the concentration of cations and the temperature of exchange reactions, etc. The lower the cation selectivity in the membranes, the higher concentration of cation to be removed in an aqueous solution and the higher is the temperature, the more is accelerated the cation exchange reaction.

Therefore, for recovering solely desirable metallic cations, it is advantageous that the metallic cation exchanged membranes are washed with a strong acid at a high temperature.

Certain cation exchange resins have been used for recovery of metallic cations. However, these resins have some drawbacks. For example, when a solution containing metallic cations to be recovered has a pH below 3, these resins are not capable of exchanging any metallic cation because of their firm incorporation with proton and, additionally, though the cation exchange reaction is accelerated according as a reaction temperature is elevated, the cation exchange capacity of these resins is gradually lowered according as the temperature is elevated.

Also, it is commonly known that zeolites, e.g. zeolite type A (Linde Company) have cation exchange properties.

However, as the zeolites exhibit a basic character, a metallic cation cannot be eluted with an acidic solution, for example, zeolite type A is easily decomposed with a solution having pH below 5. Therefore, they cannot be used for recovery of metallic cations with acid.

Extensive study has been done to discover the zeolite materials which are stable against a strong acid and have cation exchange selectivity to $Ag^+$, $Tl^+$, $Cs^+$ and $Rb^+$ in an aqueous solvent, even under the conditions having pH below about 3 and even at a high temperature of above 100° C.

An object of the present invention is to provide a method for recovery of metallic cations as an acid solution containing solely desirable metallic cations by the use of a particular zeolitic material described below. More particularly, it is to provide a method of recovering $Ag^+$ as its acid solution from a waste liquor in the photographic processes which contains silver as complex cations unexchangeable with the zeolitic material as they are, but contains silver as $Ag^+$ exchangeable when pH of the liquor is shifted to below about 4.

The above object can be realized by this invention which comprises contacting a zeolitic material represented by the formula:

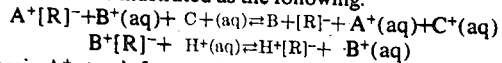    (I)

the zeolitic material being referred to as "zeolite OTW" hereinafter, wherein M represents a univalent or a ½-bivalent cation and x, y, z, and l are numerical values of $0 \leq x \leq 5$; $0 \leq y \leq 1$; $z \leq 9$ and $0 \leq l \leq 1$, respectively, with a solution containing metallic cations which are desired to be recovered, whereby the cations represented by M may be exchanged by the desired metallic cation, and then, washing the zeolite OTW with an acid to recover the desired metallic cation so exchanged.

Examples of univalent or ½-bivalent cations represented by M in the above general formula of zeolite OTW used in this invention include $H^+$, $NH_4^+$, $Li^+$, $Na^+$, $K^+$, $Rb^+$, $Cs^+$, $Ag^+$, $Tl^+$, ½$Mg^+$, ½$Ca^{++}$, ½$Sr^{++}$, ½$Ba^{++}$, ½$Pb^{++}$, ½$Mn^{++}$, ½$Co^{++}$, ½$Cu^{++}$, ½$Ni^{++}$, ½$Fe^{++}$ and the like. Although the kind of cations to be employed depends on the kind of metallic cation to be recovered, $H^+$, $K^+$, $Na^+$ and $Ca^{++}$ can usually be employed to advantage.

The order of selectivity in this zeolite OTW is as follows:
$Ag^+$, $Tl^+ > Rb^+$, $Cs^+$, $> H^+$, ½$Mg^{++}$, ½$Co^{++}$, ½$Ca^{++}$, ½$Ni^{++}$, ½$Fe^{++}$, ½$Mn^{++} >$½$Ca^{++}$, ½$Sr^{++}$, ½$Ba^{++} > Na^+$, $K^+$, $Li^+$. The following test data will support the above fact.

TEST

One liter of a solution of about pH 4.5 containing large portions of $Na^+$ and small proportions each of $Tl^+$, $Ag^+$, $Cs^+$, $Rb^+$ and $Ba^{++}$ was heated on a hot water bath, followed by the addition of 0.01 mole of zeolite OTW of formula $K_{1.5}H_{3.5}Fe_4As_3O_{16} \cdot 7H_2O$. The mixture was heated for a further 15 minutes. Then, the zeolite OTW was recovered by filtration and washed with four 50 ml. portions of a hot 2N-nitric acid. The washings were combined, concentrated and analyzed. The results are as follows:

| Original solution | | | Recovered solution | | |
|---|---|---|---|---|---|
| Kind of cation | Mole | Percent (%) | Recovered salt | Mole | Percent |
| $Na^+$ | 0.44 | 88.5 | $NaNO_3$ | 0.0002 | 1.2 |
| $Ag^+$ | 0.009 | 1.8 | $AgNO_3$ | 0.0062 | 37.8 |
| $Cs^+$ | 0.01 | 2.0 | $CsNO_3$ | 0.0033 | 20.1 |
| $Rb^+$ | 0.01 | 2.0 | $RbNO_3$ | 0.0033 | 20.1 |
| $Tl^+$ | 0.008 | 1.6 | $TlNO_3$ | 0.0024 | 14.6 |
| $Ba^{++}$ | 0.021 | 4.2 | $Ba(NO_3)_2$ | 0.0010 | 6.1 |

In the process of this invention, cation exchange reaction may be conducted at a temperature of 0° to about 250° C, desirably about 50° to about 100° C.

The suitable pH of the solution to be contacted to the zeolite OTW is within the range of about 0 to about 12, desirably about 0.5 to about 9.

The acid to be employed in the washing cycle may be any of sulfuric acid, hydrochloric acid, nitric acid, acetic acid and the like. As a rule, when use is made of e.g. nitric acid or hydrochloric acid, the molecular skeleton of the zeolite OTW is not destroyed even by heating to 50° C. in a 4N-acid solution, or by heating to 100° C. in a 2N-acid solution. In general, pH of the acids is desirably below about 0.5.

Taking the case of the process for recovering $Ag^+$, the reaction mechanisms of this invention will be described in detail as follows:

$$Na_x(Z\text{-}OTW) + kAg^+$$
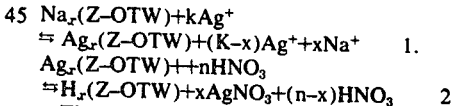
$Ag_x(Z\text{-}OTW) + nHNO_3$
$\rightleftharpoons H_x(Z\text{-}OTW) + xAgNO_3 + (n-x)HNO_3$   2.

Then, by filtering off the $H_x(Z\text{-}OTW)$ formed according to formula 2, $Ag^+$ is recovered as a solution of $AgNO_3$ in nitric acid.

The concentration process of $Ag^+$ in a solution containing $Ag^+$ and $Na^+$, for example, can be written as follows:

$K_x(Z\text{-}OTW) + sAg^+ + tNa^+$
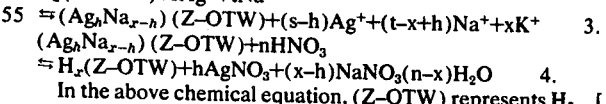
$(Ag_hNa_{x-h})(Z\text{-}OTW) + nHNO_3$
$\rightleftharpoons H_x(Z\text{-}OTW) + hAgNO_3 + (x-h)NaNO_3(n-x)H_2O$   4.

In the above chemical equation, (Z-OTW) represents $H_{5-x}[(Al_yFe_{1-y})_4(P_1As_{1-1})_3O_{16}]zH_2O$, and $h$, $k$, $n$, $s$, and $t$ are number of cations or molecules and $x, y, z,$ and are the same as mentioned in the foregoing.

However, the value of $h$ varies with the s/t ratio as shown in the following table.

| Concentration in substrate solution s/s+t | Concentration in zeolite OTW h/x |
|---|---|
| 100% | 100% |
| 16.67% | 99% |
| 9.07% | 98% |
| 1.98% | 67% |
| 0.99% | 45% |

The zeolite OTW employed in this invention can be synthesized as follows:

The sources of al. Fe, P and/or As are dissolved in water within the ranges (expressed in terms of molar ratios of their oxides) of $3.5 \leq (Al, Fe)_2O_3/(P, As)_2O_5 \leq 4.5$ and $(K, Na)_2O/(Al, Fe)_2O_3 > 0.12$.

As for the sources of Al and Fe to be employed according to this invention, there may be employed the metals as such, their chlorides, sulfides, nitrates, phosphates, arsenates and sulfates, such organic acid salts thereof as iron acetate, aluminum acetate, etc., alum containing either iron or aluminum, or their oxides and hydroxides and gels soluble in alkalis or acids. As the sources of P, use can be made of phosphorus pentoxide, phosphoric acid, and condensed acids which give phosphoric acid when dissolved in water, sodium phosphate, potassium phosphate, ammonium phosphate, (those phosphates include mono- and dihydrogen salts), water-soluble calcium phosphate, strontium phosphate, and the like. As the sources of As, use can be made of arsenic pentoxide, arsenic acid, arsenous acid, sodium arsenate, potassium arsenate, ammonium arsenate (those arsenates include mono- and dihydrogen salts), and the like.

When these sources are not supplied with sufficient amount of K or Na a hydroxide, an oxide or a salt of them must be added so as to satisfy the above ratio.

Figure 2:
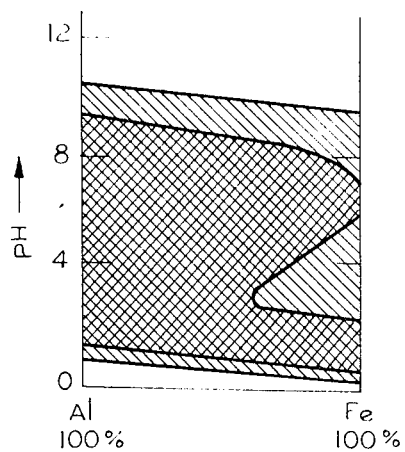
Figure 3:
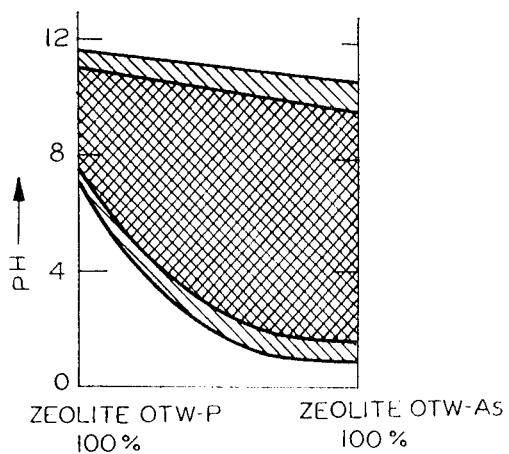
Figure 4:
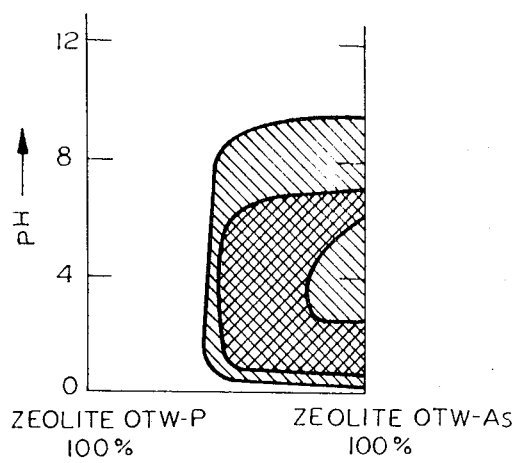

If the pH value of the resulting aqueous solution lies outside the range of 1 to 4, it is so adjusted by adding an alkali, an acid or a salt. FIGS. 1, 2, 3 and 4 respectively show pH ranges suitable for the attainment of zeolite OTW having the general formula (I) wherein l=1, l=0, y=1 and y=0.

Referring these figures, the shaded area represents the pH range for crystals containing not only zeolite OTW, but also other compounds, while the cross-hatched area represents the pH range that will give zeolite OTW alone.

The pH-adjusted solution is heated at 100° to 350° C., desirably 150° to 250° C., until crystals separate, usually for 0.5 to a few hours. The heating is desirably carried out in a closed vessel or under conditions which will otherwise keep the solvent from being lost from the reaction system.

Then, thus produced crystals are separated from the mother liquor by filtration.

The zeolite OTW employed in this invention essentially assumes a three-dimensional lattice structure which consists of 8-membered oxygen ring of Al or Fe and a tetrahedron of phosphoric acid or arsenic acid. The ratio of elemental oxygen to the sum of (Al, Fe) and (P, As) is $O/[(Fe, (Fe,Al)+(P, As)]=16/7$, at the time of synthesis, suitable numbers of univalent cations, e.g. potassium or sodium ion, as well as protons, are located in the crystal lattice for a balance of the valencies.

A characteristic X-ray powder diffraction pattern is available for zeolite OTW and can be utilized in the identification thereof. The X-ray powder diffraction pattern is set forth in table 1.

TABLE 1

| hkl | d*1 (A) | Intensity *2 |
|---|---|---|
| 100 | 8.02–7.47 | FF |
| 110 | 5.67–5.28 | ff |
| 111 | 4.63–4.31 | F |
|  | 4.01–3.73 | 2B0 |
| 210 | 3.59–3.34 | f |
| 211 | 3.27–3.05 | F |
| 220 | 2.84–2.64 | F |
| 300 | 2.68–2.49 | mF |
| 310 | 2.54–2.36 | mF |
| 311 | 2.42–2.25 | mF |
| 222 | 2.32–2.15 | mF |
| 320 | 2.225–2.072 | ff |
| 321 | 2.145–1.997 | ff |
| 400 | 2.005–1.860 | f |
| 410 | 1.945–1.813 | f |
| 411 330 | 1.891–1.761 | ff |
| 331 | 1.841–1.714 | f |
| 420 | 1.794–1.671 | f |
| 11 421 | 1.750–1.631 | ff |
| 332 | 1.711–1.593 | ff |
| 422 | 1.638–1.526 | f |
| 500 430 | 1.604–1.494 | f |
| 510 431 | 1.573–1.465 | ff |
| 333 511 | 1.544–1.438 | ff |

1 : d represents internal lattice spacing.

2 : classification
FF: very strong
F: strong
mF: rather strong
f: weak
ff: very weak

EXAMPLE 1

In 1.5 liter of water is dissolved 600 g. of ammonium iron alum, and the solution is heated on a hot water bath. On the other hand, 160 g. of $KH_2AsO_4$ and 150 g. of $K_2CO_3$ are dissolved in water under heating on a hot water-bath to prepare 0.5 liter of a solution. Both solutions are mixed together gradually in such a manner that the pH of the resulting suspension becomes about 1.5. The mixed solution is put in a reactor, and heated at 220° C. for about 1 hour, so that crystals separate. The crystals are recovered by filtration and washed with a dilute acid. The crystals are further washed with distilled water until no sulfate ion is detected. The crystals are dried at 100° C. The product zeolite OTW is of the formula $KH_4Fe_4Asb'3O_{16} \cdot 8H_2O$. Analysis:

0.47 $K_2O$, 2.00 $Fe_2O_3$, 1.51 $As_2O_5$, $H_2O$

The zeolite OTW has cubic unit cells characterized by the X-ray powder diffraction pattern shown in table 2, wherein I and d denote relative intensities and internal lattice spacings, respectively, the unit cell constant $a_0$ thereof being 8.0A.

TABLE 2

| hkl | I | d |
|---|---|---|
| 100 | 100 | 8.01 |
| 111 | 30 | 4.62 |
| 200 | 30 | 4.00 |
| 211 | 41 | 3.27 |
| 220 | 40 | 2.83 |
| 300 | 12 | 2.67 |
| 310 | 22 | 2.53 |
| 311 | 23 | 2.42 |
| 222 | 6 | 2.313 |
| 321 | 2 | 2.14 |
| 400 | 4 | 2.003 |
| 410 322 | 6 | 1.944 |
| 411 | 8 | 1.887 |
| 331 | 5 | 1.838 |
| 420 | 14 | 1.792 |
|  | 4214 | 1.749 |
| 422 | 8 | 1.634 |
| 500 430 | 7 | 1.602 |

0.018 Mole of the zeolite OTW is added to 200 ml. of a solution containing 0.1N of $Ag^+$ and the mixture is heated on a hot water bath. The pH of the solution at this stage is about 4.0. After 15 minutes. the $Ag^+$— exchanged zeolite OTW is recovered by suction filtration and added to about 100 ml. of a previously heated 2N-nitric acid. The mixture is heated on a hot water bath for about 10 minutes, then the zeolite OTW is filtered off. The residual solution is found to contain 3.15 grams as $AgNO_3$(93 percent).

EXAMPLE 2

0.01 Mole of zeolite OTW ($K_{1.4}H_{3.6}$ $Fe_4As_3O_{16} \cdot 7H_2O$) is added to 200 ml. of pre-heated, solution containing 0.1N of $Ag^+$ and the mixture as heated for about 15 minutes to cause ion-exchange reaction. The pH of the solution at this stage is about 4.0. Then, the zeolite OTW is recovered by suction filtration with a glass filter, and washed with 50 ml. portion of a 2N-nitric acid, whereby 80 percent of the $Ag^+$ contained in the zeolite OTW is recovered as a solution of $AgNO_3$. Successive washing with further three 50 ml. portions of nitric acid increases the yield to 90 percent, 93 percent and 96 percent.

The total amount of $Ag^+$ thus recovered by the use of 0.01 mole of the zeolite OTW is 2.03 grams as $AgNO_3$.

EXAMPLE 3

0.01 Mole of a zeolite OTW ($K_{1.4}H_{3.6}Fe_4As_3O_{16} \cdot 8H_2O$) is added to 400 ml. of a solution containing 0.05N of $Ag^{115}$ and 2.5N of $Na^+$, and the mixture is heated on a hot water bath for about 20 minutes, to cause ion-exchange reaction. The pH value of the suspension of the zeolite OTW at this stage is about 4.1. Then the ion-exchanged zeolite OTW is recovered by suction filtration and washed with four 50 ml. portions of a hot 2N-nitric acid. $Ag^+$ contained in the respective washings is totaled to 1.35 grams as $AgNO_3$, and the $Ag^+/Na^+$ ratio is 1.97. In other words, the concentration of $Ag^+$ relative to $Na^+$ in the original solution is heightened up to about 100 times. On the other hand, zeolite OTW recovered as above is washed with 50 ml. of a hot 2N-nitric acid. The washing is diluted with water to four times as much as its original volume, and then 0.007 mole of zeolite OTW is added as an ion-exchanger. When this solution is washed again with 50 ml. of a 2N-nitric acid, a nitric acid solution containing substantially $Ag^+$ alone is obtained.

EXAMPLE 4

Sodium monohydrogen arsenate (312 g.) is dissolved in water and the resulting solution is gradually mixed with a solution of 648 g. of aluminum sulfate in 2 liters of water followed by the addition of an aqueous solution of sodium hydroxide, in such a manner that the pH of the entire mixture is adjusted to 4-5 and the total volume of the mixture is 4 liters. The mixed solution is heated at 225° C. for 90 minutes, so that crystals are formed. The crystals are separated by suction filtration and washed with distilled water until no sulfate ion is detected. So washed crystals are dried at 100° C. This product zeolite OTW is of the formula $NaH_4Al_4As_3O_{16} \cdot 8H_2O$, the unit cell constant $a_0$ thereof being 7.69A. Analysis:

0.53 $Na_2O$, 2.00 $Al_2O_3$, 1.50 $As_2O_5$, $8H_2O$ 0.01 Mole of the zeolite OTW is added to 400 ml. of a solution containing 0.05N of $AG^+$ and about 0.5N of $Na^+$, and the mixture is heated on a hot water bath for about 15 minutes to cause ion-exchange reaction. The pH value of the zeolite OTW containing solution at this stage is about 4.0. Then the ion-exchanged zeolite OTW is recovered by suction filtration with a glass filter and washed in the same manner as in example 2. $Ag^+$ contained in the washings is totaled to 2.01 g. as $AGNO_3$. No $Na^+$ is detected in the washing.

EXAMPLE 5

A solution of 500 g. of potassium-aluminum alum in 1 liter of water is poured gradually while stirring, in a solution of 1200 g. of potassium monohydrogen phosphate in 1 liter of water. The pH of the mixed solution is adjusted to 9—9.5 with a potassium hydroxide solution. The mixed solution is put in a reactor. The reactor is sealed and maintained at 20o° C. for 90 minutes, so that crystals are formed. The crystals are separated from the mother liquor by suction filtration and washed with distilled water until no more sulfate ion is detected in the washing. The crystals are then dried at 100° C.

This product gives the following analysis.

0.51 $K_2O$, 2.00 $Al_2O_3$, —1.50 $P_2O_5$, 6.05 $H_2O$ unit cell constant $a_0$=7.474A.

The X-ray powder diffraction pattern of this product is shown in table 3.

TABLE 3

| hkl | I | d (A) |
|---|---|---|
| 100 | 100 | 7.47 |
| 111 | 15 | 4.32 |
| 200 | 45 | 3.74 |
| 211 | 50 | 3.05 |
| 220 | 34 | 2.643 |
| 300 | 20 | 2.490 |
| 310 | 25 | 2.362 |
| 311 | 7 | 2.255 |
| 222 | 15 | 2.159 |
| 321 | 5 | 1.999 |
| 400 | 5 | 1.869 |
| 410 | 10 | 1.813 |
| 330 411 | 10 | 1.762 |
| 331 | 3 | 1.715 |
| 420 | 10 | 1.672 |
| 332 | 4 | 1.595 |
| 422 | 8 | 1.526 |
| 500 | 7 | 1.495 |
| 333 511 | 3 | 1.437 |

0.02 Mole of thus produced zeolite OTW is treated after the manner in example 1 to recover $AG^+$ in an amount of 3.23 g. as $AgNO_3$ (95 percent).

EXAMPLE 6

A solution of 50 g. of sodium monohydrogen arsenate hepatahydrate and 10 g. of potassium monohydrogen phosphate in 500 ml. of water is gradually added under stirring, 200 ml. of an aqueous solution of 95 g. of potassium-aluminum-alum. When the pH of the mixed solution becomes about 3.2 with the addition of an aqueous solution of potassium hydroxide on a hot water bath, the solution is put in a reactor. Then, the reactor is sealed and maintained at 200° C. for 3 hours, so that crystals are formed. The crystals are separated from the mother liquor by suction filtration and thoroughly washed with distilled water. The crystals are then dried at 100° C.

This product gives the following analysis.

0.52 $K_2O$, 2.00 $Al_2O_3$, 1.14 $As_2O_5$, 0.38 $P_2O_5$, $8H_2O$ unit cell constant $a_0$=7.647 A. 0.017 mole of thus produced zeolite OTW is treated after the manner in example 1 to recover $Ag^+$ an amount of 3.11 g. as $AgNO_3$ (91.5 percent).

EXAMPLE 7

Ammonium iron-alum (50 g.) and 47 g. of aluminum-alum are dissolved in water. To the resulting solution is gradually added an aqueous solution containing 35 g. of sodium arsenate and 7 g. of potassium phosphate to that the total volume of the mixture becomes 1 liter. The pH of the solution is adjusted to about 8–8.5 with potassium carbonate powder. While preventing a liquid loss, the solution is heated at 250° C. for about an hour, so that crystals are formed. The crystals are separated from the mother liquor by filtration and washed with distilled water until no more sulfate ion is detected in the washing. The crystals are then dried at 100° C. This product gives the following analysis:

0.49 $K_2O$, 1.10 $Fe_2O_3$, 0.98 $Al_2O_3$, 1.15 $As_2O_5$, 0.36 $P_2O_5$, $7H_2O$.

The unit cell constant $a_0$ is 7.79 A. 0.02 Mole of thus produced zeolite OTW is treated after the manner in example 2 to recover $Ag^+$ in an amount of 4.05 g. as $AgNO_3$.

What is claimed is:

1. A method for recovery of $Ag^+$, $Tl^+$, $Rb^+$ or $Cs^+$ which comprises contacting a zeolitic material represented by the formula:

$M_xH_{5-x}[(Al_yFe_{1-y})_4(P_1As_{1-1})_3O_{16}] \cdot zH_2O$ wherein M represents $NH_4^+$, $Li^+$, $Na^+$, $K^+$, $Rb^+$, $Cs^+$, $Ag^+$, $Tl^+$, ½ $Mg^{++}$, ½ $Ca^{++}$, ½ $Sr^{++}$, ½ $Ba^{++}$, ½ $^{++}$, ½ $Mn^{++}$, ½ $Co^{++}$, ½ $Cu^{++}$, ½ $Ni^{++}$ or ½ $Fe^{++}$ and x, y, z and l are numerical values of $0 \leq x \leq 5$, $0 \leq y \leq 1$, $z \leq 9$ and $0 \leq l \leq 1$, respectively; with a solution containing $Ag^+$, $Tl^+$, $Rb^+$ or $Cs^+$ and having a pH within the range of 0 to 12 at a temperature of 0° to 250° C. whereby the cations represented by M are exchanged by the desired metallic cation and then, washing the zeolitic material with an acid at a temperature of 0° to 250° C. to recover the metallic cations.

2. A method according to claim 1, wherein the solution containing metallic cation is a solution containing $Ag^+$.

3. A method according to claim 1, wherein the acid is nitric acid.

4. A method according to claim 1, wherein pH of the solution is about 0.5 to about 9.

5. A method according to claim 1 wherein contacting the zeolitic material with solution containing metallic cations is conducted at a temperature of about 50° to about 100 C.

6. A method according to claim 1, wherein the washing is conducted at a temperature of about 50° to about 100° C.

7. A method according to claim 1, wherein pH of the acid is below about 0.5.

* * * * *